United States Patent
Terazawa et al.

(10) Patent No.: US 10,207,957 B2
(45) Date of Patent: *Feb. 19, 2019

(54) CERAMIC SCINTILLATOR AND ITS PRODUCTION METHOD, AND SCINTILLATOR ARRAY AND RADIATION DETECTOR

(71) Applicant: HITACHI METALS, LTD., Minato-ku, Tokyo (JP)

(72) Inventors: Shinsuke Terazawa, Mishima-gun (JP); Hideo Nitta, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 128 days.

This patent is subject to a terminal disclaimer.

(21) Appl. No.: 15/027,796

(22) PCT Filed: Sep. 10, 2014

(86) PCT No.: PCT/JP2014/073915
§ 371 (c)(1),
(2) Date: Apr. 7, 2016

(87) PCT Pub. No.: WO2015/053033
PCT Pub. Date: Apr. 16, 2015

(65) Prior Publication Data
US 2016/0251573 A1    Sep. 1, 2016

(30) Foreign Application Priority Data
Oct. 8, 2013    (JP) ................................ 2013-211383

(51) Int. Cl.
*C04B 35/00*    (2006.01)
*C04B 35/626*    (2006.01)
(Continued)

(52) U.S. Cl.
CPC ...... *C04B 35/6265* (2013.01); *C01F 17/0093* (2013.01); *C04B 35/5156* (2013.01);
(Continued)

(58) Field of Classification Search
CPC ............. C09K 11/7771; C01F 17/0093; C04B 35/5156; C04B 35/547; C04B 35/6261; C04B 35/6262; C04B 35/6265
See application file for complete search history.

(56) References Cited

U.S. PATENT DOCUMENTS 5,116,559 A    5/1992    Dole et al.
6,296,824 B1    10/2001    Leppert
(Continued)

FOREIGN PATENT DOCUMENTS

JP    58013688 A * 1/1983 ......... C09K 11/7769
JP    59-13625 A    1/1984
(Continued)

OTHER PUBLICATIONS

International Search Report for PCT/JP2014/073915 dated Dec. 22, 2014 [PCT/ISA/210].
(Continued)

*Primary Examiner* — Timothy Kennedy
(74) *Attorney, Agent, or Firm* — Sughrue Mion, PLLC (57) ABSTRACT

A method for producing a ceramic scintillator comprising the steps of mixing a rare earth compound with sulfuric acid and/or sulfate to cause their reaction to obtain a product; calcining the product to obtain calcined powder; reducing the calcined powder to obtain rare earth oxysulfide powder; molding the rare earth oxysulfide powder to obtain a green body; and sintering the green body; a pulverization step being conducted to adjust the particle sizes of the product and/or the calcined powder at least before the reduction step.

16 Claims, 2 Drawing Sheets

Flow Chart of First Embodiment (51) Int. Cl.
*G21K 4/00* (2006.01)
*C01F 17/00* (2006.01)
*C04B 35/515* (2006.01)
*C09K 11/77* (2006.01)
*C04B 35/547* (2006.01)
*G01T 1/20* (2006.01)

(52) U.S. Cl.
CPC ........ *C04B 35/547* (2013.01); *C04B 35/6261* (2013.01); *C04B 35/62645* (2013.01); *C09K 11/7771* (2013.01); *G01T 1/20* (2013.01); *G21K 4/00* (2013.01); *C01P 2004/51* (2013.01); *C04B 2235/3224* (2013.01); *C04B 2235/3229* (2013.01); *C04B 2235/44* (2013.01); *C04B 2235/442* (2013.01); *C04B 2235/443* (2013.01); *C04B 2235/444* (2013.01); *C04B 2235/447* (2013.01); *C04B 2235/448* (2013.01); *C04B 2235/449* (2013.01); *C04B 2235/604* (2013.01); *C04B 2235/662* (2013.01); *C04B 2235/77* (2013.01)

(56) References Cited

U.S. PATENT DOCUMENTS

| | | | |
|---|---|---|---|
| 6,504,156 B1 * | 1/2003 | Takahara | C09K 11/7771 250/361 R |
| 7,303,699 B2 | 12/2007 | Kobusch et al. | |
| 8,025,817 B2 | 9/2011 | Bolyasnikova et al. | |
| 8,652,356 B2 | 2/2014 | Okuyama et al. | |
| 9,896,623 B2 | 2/2018 | Terazawa et al. | |
| 2004/0013593 A1 * | 1/2004 | Takagimi | C01F 17/0093 423/263 |
| 2004/0100000 A1 | 5/2004 | Kobusch et al. | |
| 2005/0029495 A1 | 2/2005 | Hubacek et al. | |
| 2005/0212397 A1 * | 9/2005 | Murazaki | C09K 11/0883 313/487 |
| 2008/0210885 A1 | 9/2008 | Bolyasnikova et al. | |
| 2010/0130350 A1 | 5/2010 | Machida et al. | |
| 2010/0237765 A1 | 9/2010 | Okuyama et al. | |
| 2016/0230085 A1 | 8/2016 | Terazawa et al. | |

FOREIGN PATENT DOCUMENTS

| | | | |
|---|---|---|---|
| JP | 62253685 A | * | 11/1987 |
| JP | 5-17224 A | | 1/1993 |
| JP | 07-223861 A | | 8/1995 |
| JP | 2989184 B1 | | 12/1999 |
| JP | 2000-313619 A | | 11/2000 |
| JP | 2002-220587 A | | 8/2002 |
| JP | 2002275465 A | | 9/2002 |
| JP | 2004-525848 A | | 8/2004 |
| JP | 2005-54046 A | | 3/2005 |
| JP | 2006-117489 A | | 5/2006 |
| JP | 2008-501611 A | | 1/2008 |
| JP | 2013-100388 A | | 5/2013 |
| WO | 2010/001624 A1 | | 1/2010 |
| WO | 2015/045870 A1 | | 8/2018 |

OTHER PUBLICATIONS

Communication dated May 23, 2017 from the European Patent Office in counterpart application No. 14852205.5.
Communication dated Aug. 7, 2018 from the Japanese Patent Office in counterpart application No. 2015-541491.

* cited by examiner

Fig. 1

Flow Chart of First Embodiment

Fig. 2

Flow Chart of Second Embodiment

Fig. 3

CERAMIC SCINTILLATOR AND ITS PRODUCTION METHOD, AND SCINTILLATOR ARRAY AND RADIATION DETECTOR

CROSS REFERENCE TO RELATED APPLICATIONS

This application is a National Stage of International Application No. PCT/JP2014/073915 filed Sep. 10, 2014 (claiming priority based on Japanese Patent Application No. 2013-211383 filed Oct. 8, 2013), the contents of which are incorporated herein by reference in their entirety.

FIELD OF THE INVENTION

The present invention relates to a ceramic scintillator suitable for radiation detectors of X-ray CT apparatuses, etc., and its production method, and a scintillator array and a radiation detector using it.

BACKGROUND OF THE INVENTION

One of X-ray diagnosis apparatuses is a computed tomography (CT) apparatus. The CT apparatus comprises an X-ray tube for radiating X-ray fan beams, and a radiation detector comprising a large number of radiation detection elements. X-ray fan beams radiated from the X-ray tube pass through an object to be measured, and are detected by the radiation detector. The detected data are analyzed by a computer to display a cross section of the object. The measured data are analyzed by a computer to calculate X-ray absorbance at each position in each cross section of the object by a computer, thereby forming an image based on the X-ray absorbance.

As radiation detectors for detecting radiations such as X-rays, etc., radiation detectors comprising radiation-detecting elements obtained by combining ceramic scintillators produced by sintering rare earth oxysulfide powder such as $Gd_2O_2S$, $Y_2O_2S$, $Lu_2O_2S$, etc. comprising Pr, Ce, Eu, Tb, etc. as luminescent elements, and silicon photodiodes have been developed and put into practical use. In the radiation detector comprising ceramic scintillators, radiation-detecting elements can easily be made small to increase the number of channels, thereby obtaining high-resolution image.

In such radiation-detecting elements, when scintillators absorbing radiations emit light with large intensity (luminescence intensity), they have high sensitivity. Diagnosis apparatuses utilizing radiations are recently required strongly to reduce radiations to which humans are exposed. As a result, it has become important to shorten the scanning time. Shorter scanning time from the present level results in shorter integration time in one detecting element, thereby reducing the total amount of radiations absorbed during the integration time. Accordingly, scintillators having high luminescence efficiency (large luminescence intensity) are particularly needed.

JP 2000-313619 A discloses a method for producing rare earth oxysulfide powder used in scintillators, comprising the steps of dispersing at least one rare earth oxide in water, adding 1 mol of sulfuric acid or sulfate corresponding to at least one rare earth to 1 mol of rare earth oxide, calcining the resultant powdery precipitate, and reducing the resultant rare earth oxysulfate.

JP 2004-525848 A discloses a method for producing a high-density, translucent scintillator ceramic, which comprises wet-pulverizing rare earth oxysulfide powder having a specific surface area of at least 10 $m^2/g$ in a pulverizing organic liquid to powder having particle sizes of less than 10 µm, forming this powder into a green body having a density of 40-60%, and sintering the green body at a temperature of 1200-1450° C. under atmospheric pressure in vacuum or an inert gas.

Because the rare earth oxysulfide powder obtained by the production method of JP 2000-313619 A contains large particles, high-density sintered bodies cannot be obtained by sintering under normal pressure. To obtain high-density sintered bodies, hot pressing or hot-isostatic pressing should be conducted for sintering, resulting in high cost.

In the production method of JP 2004-525848 A, rare earth oxysulfide is wet-pulverized in a pulverizing organic liquid to adjust its particle sizes, but sulfur is dissociated from rare earth oxysulfide during pulverization, resulting in lattice defects due to the voids of sulfur introduced into rare earth oxysulfide. The lattice defects remain even in a ceramic scintillator obtained by sintering rare earth oxysulfide, so that the ceramic scintillator has poor luminescence intensity.

OBJECT OF THE INVENTION

Accordingly, an object of the present invention is to provide a method for easily producing a high-density sintered ceramic scintillator while suppressing decrease in luminescence intensity.

Another object of the present invention is to provide a ceramic scintillator produced by such a method, a scintillator array comprising it, and a radiation detector suitable for X-ray CT apparatuses, etc.

DISCLOSURE OF THE INVENTION

As a result of intensive research in view of the above objects, the inventors have found that by conducting a pulverization step before a reduction step for obtaining rare earth oxysulfide, instead of conducting a pulverization step after rare earth oxysulfide powder is formed, the particle sizes can be adjusted while suppressing the dissociation of sulfur. The present invention has been completed based on such finding.

Thus, the method of the present invention for producing a ceramic scintillator comprises the steps of
mixing a rare earth compound with sulfuric acid and/or sulfate to cause their reaction to obtain a product;
calcining the product to obtain calcined powder;
reducing the calcined powder to obtain rare earth oxysulfide powder;
molding the rare earth oxysulfide powder to obtain a green body; and sintering the green body;
a pulverization step being conducted to adjust the particle sizes of the product and/or the calcined powder at least before the reduction step.

When the pulverization step for adjusting the particle sizes of the product is conducted after the mixing step, it is preferable to carry out the calcining step at 1000° C. or lower, and the reduction step at 900° C. or lower.

When the pulverization step for adjusting the particle sizes of the powder is conducted after the calcining step, the reduction step is conducted preferably at 900° C. or lower. The mixing step is preferably conducted in a liquid, and the pulverization step is preferably wet pulverization.

The pulverization step for adjusting the particle sizes of the rare earth oxysulfide powder is preferably not conducted after the reduction step. The sintering step is carried out preferably in an inert atmosphere, without applying higher pressure than atmospheric pressure to the green body.

The rare earth compound is preferably at least one selected from the group consisting of oxides, hydroxides, halides, nitrates, sulfates, acetates, phosphates, and carbonates of rare earth elements. The rare earth compound preferably comprises at least gadolinium oxide, or at least gadolinium oxide and praseodymium oxide.

A rare earth compound comprising one type of a rare earth element or rare earth compounds comprising plural types of rare earth elements may be used as the rare earth compound. When rare earth compounds comprising plural types of rare earth elements are mixed in the mixing step, smaller amounts of rare earth compounds are preferably earlier added to an aqueous solution of sulfate ions.

After the sintering step, the sintered body is preferably annealed.

The ceramic scintillator of the present invention is obtained by the above method.

The scintillator array and radiation detector of the present invention comprise such ceramic scintillators.

DESCRIPTION OF THE PREFERRED EMBODIMENTS

One of the important features of the present invention is based on the discovery that the dissociation of sulfur can be suppressed by conducting a pulverization step, before a reduction step for obtaining rare earth oxysulfide powder is carried out. Though reasons therefor are not necessarily clear, it may be presumed that a compound before the reduction step for forming rare earth oxysulfide is more stable than rare earth oxysulfide, so that it suffers less dissociation of sulfur in the pulverization step.

Because the dissociation of sulfur can be suppressed in the pulverization step for obtaining highly sinterable powder in the present invention, it is possible to avoid decrease in the luminescence intensity of a ceramic scintillator formed. The ceramic scintillator and its production method, and the scintillator array and the radiation detector of the present invention will be explained in detail below, without intention of restricting the present invention to embodiments below.

[1] First Embodiment

Figure 1:
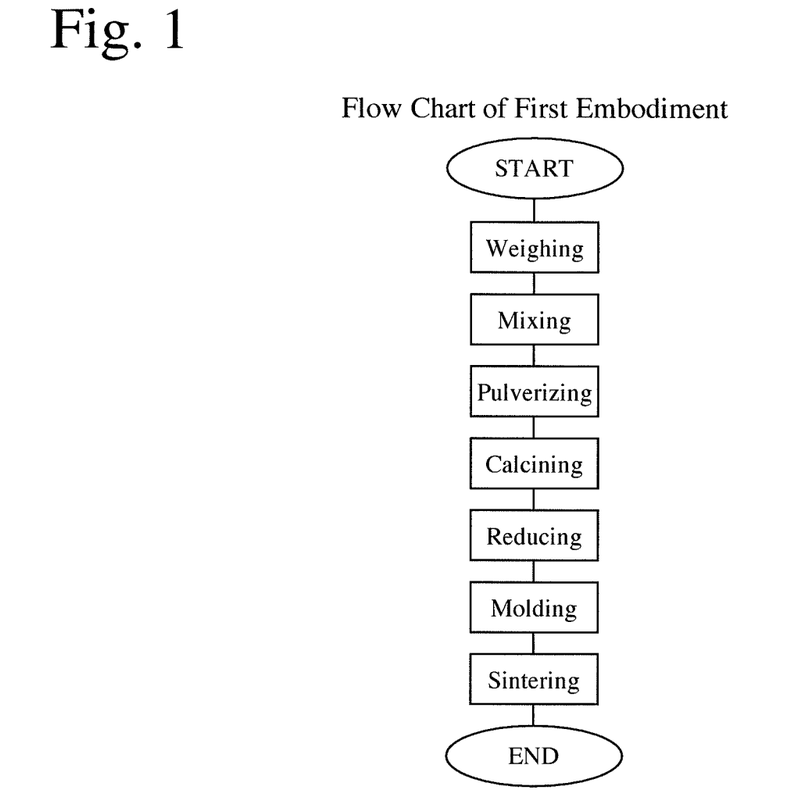
FIG. 1 is a view showing the production method of a ceramic scintillator according to the first embodiment of the present invention.

FIG. 1 shows a flow chart of the production method of a ceramic scintillator according to the first embodiment of the present invention.

(1-1) Weighing Step

Predetermined amounts of rare earth compound powder, sulfuric acid or sulfate are first prepared in a weighing step. The rare earth compound may be at least one selected from the group consisting of oxides, hydroxides, halides, nitrates, sulfates, acetates, phosphates and carbonates of rare earth elements, and the oxides of rare earth elements are particularly preferable as chemically stable materials easily having high purity.

The rare earth elements are 17 elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). For the rare earth compound powder, a rare earth compound containing one or more of the above rare earth elements may be used. When a rare earth compound containing one rare earth element is used, the rare earth element is preferably gadolinium. When a rare earth compound containing plural types of rare earth elements is used, the rare earth element preferably includes at least gadolinium, and may contain praseodymium in addition to gadolinium.

The amount of sulfuric acid and/or sulfate added is desirably enough to obtain rare earth oxysulfide having the general formula of $RE_2O_2S$, wherein RE represents a rare earth element. Specifically, sulfuric acid and/or sulfate may be added in such an amount that sulfate ions are 0.5 mol per 1 mol of the rare earth element, but taking into consideration component deviation due to the dissociation of sulfur in the production step, the amount of sulfate ions may be more than 0.5 mol, for example, 0.5-1.75 mol. Particularly, when the amount of sulfate ions is 0.75-1.75 mol, rare earth oxysulfide powder containing little foreign phases can be obtained. When sulfate containing a rare earth element is used with a rare earth element-containing compound, the rare earth element in the sulfate is included in determining the total amount of the rare earth element. When a rare earth compound containing sulfate ions is used with sulfuric acid and/or sulfate, sulfate ions in the rare earth compound are included in determining the total amount of sulfate ions.

(1-2) Mixing Step

In the mixing step, the rare earth compound is reacted with sulfuric acid or sulfate, and the resultant product is collected. The method of mixing the rare earth compound with sulfuric acid includes, for example, (1) a method of adding a rare earth compound powder to sulfuric acid, and stirring the resultant mixture to cause their reaction, and (2) a method of adding a rare earth compound powder to water, stirring the resultant mixture, and then adding sulfuric acid to cause their reaction.

In the case of the method (1), the concentration of sulfuric acid is not particularly restricted, but diluted sulfuric acid is preferably 0.1-2 mol to 1 liter of water, from the aspect of a reaction speed with the rare earth compound. The rare earth compound powder may be added by a known means. When rare earth compounds comprising plural types of rare earth elements are used, rare earth compounds containing smaller amounts of rare earth elements are preferably earlier added to sulfuric acid, so that smaller amounts of rare earth compounds can be earlier reacted and diffused to avoid composition segregation in the product.

In the case of the method (2), the concentration of the rare earth compound in an aqueous mixed liquid is not particularly restricted, but it is preferably 0.05-2 mol to 1 litter of water, from the aspect of the dispersibility (uniformity of composition) of the rare earth compound and a reaction speed after adding sulfuric acid. Sulfuric acid may be added to the above mixed liquid by a known means. The concentration of sulfuric acid is preferably 10-98% by mass. When the rare earth compound is substantially insoluble in water like rare earth oxide, the rare earth compound powder is dispersed in water.

When the rare earth compound is mixed with sulfate, fuming sulfuric acid, ammonium sulfate, etc. may be used as the sulfate, and it is preferable to use sulfate containing the same rare earth element as in the rare earth oxysulfide powder. The method of mixing the rare earth compound with sulfate includes, for example, (3) a method of adding sulfate to water, adding the rare earth compound powder to the resultant aqueous solution, and stirring the mixture to cause their reaction, and (4) a method of adding the rare earth compound powder to water, stirring the mixture, and adding an aqueous sulfate solution to the mixture to cause their reaction. Sulfate may be added by a known method.

When the rare earth compound powder is mixed with sulfate ions in water, reaction heat is generated. The concentration of the rare earth element in the mixed liquid after the rare earth compound powder is reacted with sulfate ions is in a negative correlation to the temperature of the mixed liquid. Accordingly, a product is precipitated by the temperature elevation of the mixed liquid due to the reaction heat. A precipitate-containing mixed liquid may be heated to and kept at a predetermined temperature for a predetermined period of time. Heating accelerates the formation of the product. The precipitate may be separated from the mixed liquid and dried by heat, or the mixed liquid may be heated to evaporate the liquid to collect the precipitate. When the mixed liquid is heated, the number of steps is preferably reduced because aging occurs simultaneously.

The product is a mixed salt of rare earth sulfate and the rare earth compound, or has a composition mainly containing rare earth sulfate, though variable depending on a molar ratio of sulfuric acid or sulfate to the rare earth compound mixed.

(1-3) Pulverization Step

In the pulverization step, the product is pulverized to adjust its particle sizes. The product may be pulverized by a known means, such as wet pulverization using a liquid such as water and ethanol as a medium, dry pulverization without using a liquid medium, etc. Taking into consideration steps before and after the pulverization step, wet pulverization in a ball mill is preferable for a low cost, good dispersibility, and high efficiency.

After the mixing step for obtaining a precipitate, the product is charged into a wet pulverization apparatus together with a reaction liquid, to carry out wet pulverization. As a result, an easily pulverizable soft powdery product can be obtained while omitting drying. Before filtering out, the precipitate in the mixed liquid may be wet-pulverized.

(1-4) Calcining Step

The pulverized product is calcined in the calcining step. The calcining step is preferably conducted in air at atmospheric pressure. The calcining temperature is preferably 300-1000° C., more preferably 600-900° C., to obtain more uniform calcined powder. When the calcining temperature is higher than 1000° C., particle growth is activated in the pulverized powder, resulting in large deviation of particle sizes. When the calcining temperature is lower than 300° C., a calcining reaction does not sufficiently proceed. Sulfur-containing gases such as $H_2S$, $SO_x$, etc. generated at this time can be collected by a known technique, such as bubbling in a neutralizing aqueous solution, etc.

The calcined powder has a composition comprising as main components rare earth sulfate and rare earth oxysulfate, or rare earth oxysulfate alone, though variable depending on a molar ratio of sulfuric acid or sulfate to the rare earth compound added.

(1-5) Reduction Step

In the reduction step, the calcined powder is reduced, using as a reducing agent a hydrogen gas, a hydrocarbon gas such as methane and propane, etc. The reduction treatment is preferably conducted at a temperature of 900° C. or lower, in an atmosphere which may contain, for example, an inert gas such as nitrogen ($N_2$) and argon (Ar) in addition to the above reducing agent, depending on a reaction speed. Sulfur-containing gases such as $H_2S$, $SO_x$, etc. generated at this time can be collected by a known technique such as bubbling in a neutralizing aqueous solution, etc. When the reduction temperature is 900° C. or lower, the reduction treatment can be conducted while suppressing grain growth of the calcined powder. The reduction time is preferably 1-180 minutes. At 900° C. or lower, a longer reduction time is acceptable as long as grain growth is avoided.

With particle sizes adjusted without dissociation of sulfur in the pulverization step, the reduction treatment can be conducted under the conditions of suppressing particle size increase as described above, to produce rare earth oxysulfide having desired particle sizes. Because the reduction temperature of 900° C. or lower suppresses grain growth in the calcined powder, pulverization need not be conducted again after reduction. If pulverization were conducted after rare earth oxysulfide is formed by reduction, sulfur would be dissociated, likely causing defects. However, a step for disintegrating rare earth oxysulfide particles agglomerated in the reduction step may be conducted.

(1-6) Molding Step

The resultant rare earth oxysulfide powder is granulated to form granules. The granulation step can be conducted by a known method. Using rare earth oxysulfide granules, a green body is formed by a known method, such as mono-axial pressing, cold-isostatic pressing, etc. The molding pressure is at least higher than pressure necessary for obtaining a green body acquiring a sufficient density in the subsequent sintering step, and lower than pressure necessary for avoiding the dissociation of sulfur by the compression of powder.

(1-7) Sintering Step

The resultant green body is sintered to form a sintered body in an inert atmosphere such as nitrogen ($N_2$) and argon (Ar). Rare earth oxysulfide is oxidized to rare earth oxide when heated in an oxidizing atmosphere, while it is reduced to have defects due to voids of sulfur and oxygen when heated in a reducing atmosphere. Accordingly, rare earth oxysulfide is sintered preferably in an inert atmosphere. A stable material neither oxidized nor reduced at high temperatures is preferably used for a jig such as a crucible and a setter. The sintering temperature is preferably 1300-1600° C., more preferably 1500-1600° C. Though pressure sintering such as hot pressing (HP) and hot-isostatic pressing (HIP) may be conducted, sintering under about atmospheric pressure in an inexpensive apparatus needing no pressure-resistant structure unlike HP and HIP is preferable. Because the rare earth oxysulfide powder has particle sizes made smaller by the pulverization step, a high-density sintered body can be obtained without pressure sintering. To remove strain, the sintered body may be annealed in an inert atmosphere. Annealing improves the luminescence intensity.

The sintered body can be used as a ceramic scintillator. For example, when the rare earth elements in rare earth oxysulfide are gadolinium, praseodymium and cerium, the sintered body is a ceramic scintillator of gadolinium oxysulfide containing praseodymium as a luminescent element, and cerium as an additive for adjusting afterglow. Because rare earth oxysulfide obtained by the above steps hardly suffers the dissociation of sulfur and lattice defects by pulverization, the ceramic scintillator of the present invention obtained from such rare earth oxysulfide is a high-density, translucent sintered body having large luminescence intensity and high-sensitivity response to radiations.

[2] Second Embodiment

Figure 2:
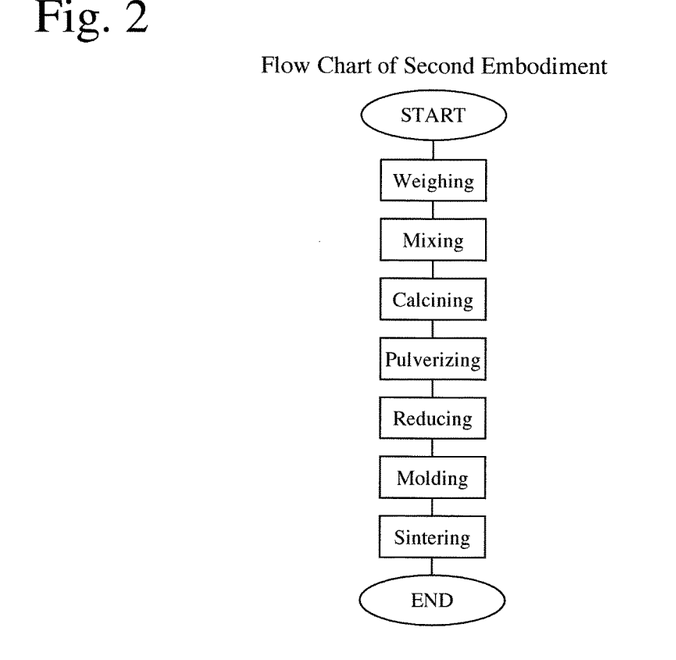
FIG. 2 is a view showing the production method of a ceramic scintillator according to the second embodiment of the present invention.

FIG. 2 is a flow chart showing the production method of rare earth oxysulfide according to the second embodiment of the present invention. The second embodiment is the same as the first embodiment, except that the pulverization step is conducted after the calcining step. Though powder particles may partially grow due to temporarily elevated temperature in the calcining step, grown particles are pulverized in the second embodiment, so that the particle sizes are adjusted.

[3] Scintillator Array

The scintillator array of the present invention comprises pluralities of the above ceramic scintillators arranged with a reflecting material on a substrate.

The scintillator array may have a known structure and may be produced by a known method. For example, the scintillator array can be produced by fixing a ceramic scintillator plate to a support plate via a double-sided adhesive sheet, providing the scintillator plate with grooves to form a grooved scintillator substrate plate having pluralities of scintillator cells, filling the grooves with a liquid hardening resin for a reflecting material, curing the liquid hardening resin to form a resin-hardened scintillator cell body, and peeling the double-sided adhesive sheet from the resin-hardened scintillator cell body.

[4] Radiation Detector

The radiation detector of the present invention comprises the above ceramic scintillators, and detecting elements such as silicon photodiodes for detecting light emitted from the ceramic scintillators. The above scintillator arrays are preferably aligned with corresponding silicon photodiode arrays to efficiently constitute a radiation detector. For example, a luminescence surface of each scintillator array comprising the ceramic scintillators obtained by the above method is adhered with an optical resin to a light-receiving surface of each light-receiving element array. This radiation detector is suitably used in an imaging apparatus for medical diagnosis, such as X-ray CT, PET (positron emission tomography)/CT, etc. Using the scintillator of the present invention having large luminescence intensity, a high-performance radiation detector having high-sensitivity response to X-rays and excellent stability can be obtained.

The present invention will be explained specifically by Examples below. The ceramic scintillator and its production method, and the scintillator array and the radiation detector in the present invention are not restricted to Examples below.

EXAMPLE 1

A ceramic scintillator was produced according to the first embodiment of pulverizing the product obtained by the mixing step.

(1) Weighing Step 163.62 g of sulfuric acid having a concentration of 96% by mass was weighed and added to 1600 ml of pure water in a 3-liter beaker, to prepare dilute sulfuric acid.

(2) Mixing Step 0.0113 g of cerium nitrate, 0.2561 g of praseodymium oxide and 290.00 g of gadolinium oxide were added in this order to dilute sulfuric acid in a 3-liter beaker. Diluted sulfuric acid was reacted with cerium nitrate, praseodymium oxide and gadolinium oxide to precipitate a product. The resultant suspension was heated to and kept at 90° C. for 150 minutes or more in a hot bath, while stirring by a stirrer.

The suspension was filtered by a Buchner funnel while stirring, to obtain a product. The product was dried at 120° C. for 12 hours, and then disintegrated by a mortar to sizes passing through a sieve having openings of 500 μm.

(3) Pulverization Step 100 g of the product and 200 ml of ethanol were charged into a ball mill, and wet-pulverized at 100 rpm for 15 hours. The pulverized slurry was dried at 100° C. for 4-6 hours. The dried product was disintegrated by a mortar to sizes passing through a sieve having openings of 500 μm, to obtain fine product particles.

(4) Calcining Step

The wet-pulverized product was charged into an alumina crucible, and calcined at 900° C. for 1 hour in air at atmospheric pressure in an electric furnace. An $H_2O$ gas and an $SO_3$ gas generated by the reaction were disposed by a gas-treating apparatus.

(5) Reduction Step

The calcined powder was charged into an alumina crucible, and reduced at 800° C. for 3 hours in a reducing furnace having a hydrogen atmosphere. An $H_2O$ gas and an $H_2S$ gas generated by the reduction treatment were disposed by a gas-treating apparatus. This reduction reaction provided rare earth oxysulfide $(Gd, Pr, Ce)_2O_2S$.

(6) Molding Step

This rare earth oxysulfide was compression-molded at 49 MPa by a mono-axial pressing machine, vacuum-sealed in a plastic bag, and compression-molded at 294 MPa by a CIP machine.

(7) Sintering Step

The green body was sintered at 1500° C. in a nitrogen atmosphere in a high-temperature sintering furnace. The sintered body was heat-treated at 1100° C. for 2 hours in an argon atmosphere containing a trace amount of oxygen, and then annealed to remove oxygen defects generated by sintering, thereby obtaining a ceramic scintillator.

EXAMPLE 2

A ceramic scintillator was produced under the same conditions as in Example 1, except that the order of the pulverization step (3) and the calcining step (4) was changed according to the second embodiment, in which the calcined product was pulverized.

Namely, a reaction product obtained by the mixing step (2) was charged into an alumina crucible, and calcined at 900° C. for 1 hour in air at atmospheric pressure in a GOS calcining furnace. An $H_2O$ gas and an $H_2S$ gas generated by the reaction were disposed by a gas-treating apparatus.

100 g of the calcined product was charged into a ball mill together with 200 ml of ethanol, and wet-pulverized at 100 rpm for 15 hours. The pulverized slurry was dried at 100° C. for 4-6 hours. The dried product was disintegrated in a mortar to sizes passing through a sieve having openings of 500 μm, to obtain fine calcined product particles. The fine calcined product particles were subjected to the same reduction step (5), molding step (6) and sintering step (7) as in Example 1, to obtain a ceramic scintillator.

COMPARATIVE EXAMPLE 1

A ceramic scintillator was produced under the same conditions as in

Example 1, except that the pulverization step (3) was not conducted.

COMPARATIVE EXAMPLE 2

The pulverization step was conducted after the reduction step. The weighing step (1), the mixing step (2), the calcining step (4), and the reduction step (5) were conducted in this order in the same manner as in Example 1.

100 g of rare earth oxysulfide powder obtained by the reduction step (5) was charged into a ball mill together with 200 ml of ethanol, and wet-pulverized at 100 rpm for 15 hours. The pulverized slurry was dried at 100° C. for 4-6 hours. The dried product was disintegrated by a mortar to sizes passing through a sieve having openings of 500 μm, to obtain fine rare earth oxysulfide powder. This fine rare earth oxysulfide powder was subjected to the same molding step (6) and sintering step (7) as in Example 1, to obtain a ceramic scintillator.

The density of each ceramic scintillator of Examples 1 and 2, and Comparative Examples 1 and 2 was measured by an Archimedean method. Also, each ceramic scintillator was irradiated with X-rays generated from an X-ray tube having a W target under the conditions of tube voltage of 90 kV and tube current of 20 mA, and light emitted from the ceramic scintillator was received by a light-receiving Si photodiode to measure the luminescence intensity of each ceramic scintillator. The luminescence intensity is expressed by a relative value, assuming that it is 100 in Example 2. The intensity of light measured by the light-receiving Si photodiode after 3 milliseconds (ms) from the stop of X-ray irradiation is expressed as "3 ms afterglow," a relative value to the intensity of light measured by the light-receiving Si photodiode during the entire period of X-ray irradiation. The results are shown in Table 1.

TABLE 1

| No. | Density of Sintered Body (g/cm$^3$) | Luminescence Intensity (%) | 3 ms Afterglow (ppm) |
|---|---|---|---|
| Example 1 | 7.34 | 103 | 107 |
| Example 2 | 7.35 | 100 | 132 |
| Com. Ex. 1 | 7.26 | 85 | 152 |
| Com. Ex. 2 | 7.36 | 92 | 900 |

As is clear from Table 1, the ceramic scintillator of Comparative

Example 1 obtained with no pulverization step had a low density and small luminescence intensity. Comparative Example 2 conducting the pulverization step after the reduction step provided low luminescence intensity despite a high sintered body density. This verifies that a ceramic scintillator having a high density and large luminescence intensity is obtained from rare earth oxysulfide powder, which is produced by carrying out a pulverization step for adjusting particle sizes before a reduction step for obtaining rare earth oxysulfide, and then reducing the pulverized body having suppressed particle sizes. It may be presumed from the luminescence mechanism of a ceramic scintillator that extremely large 3 ms afterglow is caused by sulfur defects.

EXAMPLE 3

Rare earth oxysulfide powder was produced by conducting the same weighing step (1), mixing step (2), pulverization step (3), calcining step (4) and reduction step (5) as in Example 1, except that 81.81 g of sulfuric acid having a concentration of 96% by mass was weighed in the weighing step, and that the pulverization time was 40 hours in the pulverization step. Using such rare earth oxysulfide powder, a ceramic scintillator was produced in the same manner as in Example 1.

EXAMPLE 4

Rare earth oxysulfide powder was produced by conducting the same weighing step (1), mixing step (2), calcining step (4), pulverization step (3), and reduction step (5) as in Example 2, except that 81.81 g of sulfuric acid having a concentration of 96% by mass was weighed in the weighing step, and that the pulverization time was 40 hours in the pulverization step. Using such rare earth oxysulfide powder, a ceramic scintillator was produced in the same manner as in Example 2.

COMPARATIVE EXAMPLE 3

Rare earth oxysulfide powder was produced by conducting the same weighing step (1), mixing step (2), calcining step (4) and reduction step (5) as in
Comparative Example 1, except that 81.81 g of sulfuric acid having a concentration of 96% by mass was weighed in the weighing step. Using such rare earth oxysulfide powder, a ceramic scintillator was produced in the same manner as in Comparative Example 1.

COMPARATIVE EXAMPLE 4

Rare earth oxysulfide powder was produced by conducting the same weighing step (1), mixing step (2), calcining step (4) and reduction step (5) as in Comparative Example 2, and then conducting a pulverization step, except that 81.81 g of sulfuric acid having a concentration of 96% by mass was weighed in the weighing step, and that the pulverization time was 40 hours in the pulverization step. Using such rare earth oxysulfide powder, a ceramic scintillator was produced in the same manner as in Comparative Example 2.

Figure 3:
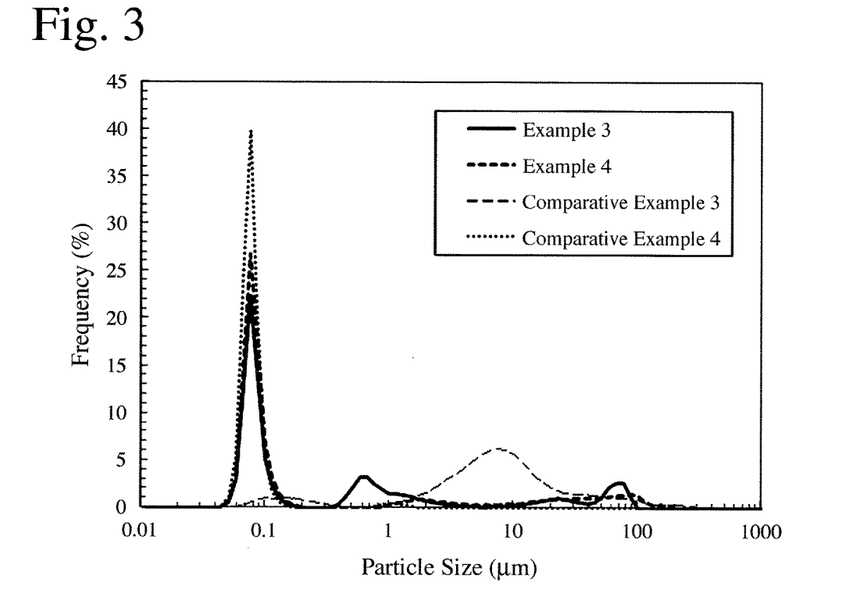
FIG. 3 is a graph showing the particle size distributions of rare earth oxysulfide powders.

FIG. 3 shows the particle size distributions of the rare earth oxysulfide powders of Examples 3 and 4, and Comparative Examples 3 and 4, which were measured by a wet laser diffraction method, using a particle size distribution meter LA-950 available from Horiba Ltd. Each sample was dispersed in pure water containing hexametaphosphoric acid as a dispersant, and stirred while applying ultrasonic vibration for 10 minutes, to measure the particle size distribution. As is clear from FIG. 3, Comparative Example 3 having no pulverization step had a particle size distribution shifted to the larger side than others. This indicates that by conducting a pulverization step for adjusting particle sizes before the reduction step for obtaining rare earth oxysulfide powder, the particle size distribution after the reduction step can be decreased. Each rare earth oxysulfide powder of Examples 3 and 4 had larger average particle size than that of Comparative Example 4, because of heating in the reduction step after the pulverization step.

Measured by the same methods as in Example 1, the ceramic scintillators of Examples 3 and 4, and Comparative Examples 3 and 4 had densities, luminescence intensities and 3 ms afterglow on the same levels as in Examples 1 and 2. The ceramic scintillator of Comparative Example 3 having no pulverization step had a low density and small luminescence intensity. Comparative Example 4 conducting the pulverization step after the reduction step had small luminescence intensity despite a high density. This indicates that the ceramic scintillators of Examples 3 and 4 had larger average particle sizes and higher luminescence intensities and 3ms afterglow than those of Comparative Example 4, and that even when a half amount of sulfuric acid is used in the weighing step as compared with Examples 1 and 2, a ceramic scintillator having a high density and large luminescence intensity is obtained.

EXAMPLE 5

A ceramic scintillator was produced in the same manner as in Example 3, except that pulverization was conducted for 15 hours, using water in place of ethanol as a pulverization solvent in the pulverization step. The resultant ceramic scintillator had a density of 7.34 g/cm$^3$, luminescence intensity of 101%, and 3 ms afterglow of 181 ppm. This confirms that even if water is used in place of ethanol as a pulverization solvent in the pulverization step, a ceramic scintillator of a high-density sintered body having large luminescence intensity and high-sensitivity response to radiations is obtained.

Effect of the Invention

By conducting a pulverization step before a reduction step for obtaining rare earth oxysulfide powder according to the present invention, the particle sizes of rare earth oxysulfide powder can be adjusted, while suppressing the dissociation of sulfur. Accordingly, a ceramic scintillator produced by using such rare earth oxysulfide powder, which is a high-density sintered body, has large luminescence intensity and high-sensitivity response to radiations.

What is claimed is:

1. A method for producing a ceramic scintillator comprising the steps of
    mixing at least one rare earth compound with sulfuric acid and/or sulfate to cause their reaction to obtain a product;
    calcining said product to obtain calcined powder;
    reducing said calcined powder to obtain rare earth oxysulfide powder;
    molding said rare earth oxysulfide powder to obtain a green body; and
    sintering said green body;
    a pulverization step being conducted to adjust the particle sizes of the product and/or the calcined powder at least before the reduction step, and
    a pulverization step for adjusting the particle sizes of said rare earth oxysulfide powder being not conducted after said reduction step.

2. The method for producing a ceramic scintillator according to claim 1, wherein said mixing step is followed by said pulverization step, and by said calcining step at 1000° C. or lower; and wherein said reduction step is conducted at 900° C. or lower.

3. The method for producing a ceramic scintillator according to claim 1, wherein said calcining step is followed by said pulverization step, and by said reduction step at 900° C. or lower.

4. The method for producing a ceramic scintillator according to claim 1, wherein mixing in a liquid is conducted in said mixing step; and wherein wet pulverization is conducted in said pulverization step.

5. The method for producing a ceramic scintillator according to claim 1, wherein said sintering step is conducted in an inert atmosphere without applying higher pressure than atmospheric pressure to said green body.

6. The method for producing a ceramic scintillator according to claim 1, wherein said at least one rare earth compound is at least one selected from the group consisting of oxides, hydroxides, halides, nitrates, sulfates, acetates, phosphates, and carbonates of rare earth elements.

7. The method for producing a ceramic scintillator according to claim 6, wherein said at least one rare earth compound comprises at least gadolinium oxide.

8. The method for producing a ceramic scintillator according to claim 6, wherein said at least one rare earth compound comprises at least gadolinium oxide and praseodymium oxide.

9. The method for producing a ceramic scintillator according to claim 1, wherein (i) the at least one rare earth compound comprises different amounts of rare earth compounds of plural types of rare earth elements, and (ii) the rare earth compounds are added to sulfuric acid and/or sulfate in said mixing step in order of increasing amount.

10. The method for producing a ceramic scintillator according to claim 1, which further comprises a step of annealing said sintered body.

11. A method for producing a scintillator array comprising pluralities of ceramic scintillators arranged with a reflecting material, the method comprising the steps of
    mixing at least one rare earth compound with sulfuric acid and/or sulfate to cause their reaction to obtain a product;
    calcining said product to obtain calcined powder;
    reducing said calcined powder to obtain rare earth oxysulfide powder;
    molding said rare earth oxysulfide powder to obtain a green body;
    sintering said green body to obtain ceramic scintillators; and
    arranging pluralities of said ceramic scintillators with a reflecting material to obtain a scintillator array;
    a pulverization step being conducted to adjust the particle sizes of the product and/or the calcined powder at least before the reduction step, and
    a pulverization step for adjusting the particle sizes of said rare earth oxysulfide powder being not conducted after said reduction step.

12. A method for producing a radiation detector comprising ceramic scintillators and detecting elements for detecting light emitted from said ceramic scintillators, the method comprising the steps of
    mixing at least one rare earth compound with sulfuric acid and/or sulfate to cause their reaction to obtain a product;
    calcining said product to obtain calcined powder;
    reducing said calcined powder to obtain rare earth oxysulfide powder;
    molding said rare earth oxysulfide powder to obtain a green body;
    sintering said green body to obtain ceramic scintillators; and
    combining said ceramic scintillators with detecting elements for detecting light emitted from said ceramic scintillators to obtain a radiation detector;
    a pulverization step being conducted to adjust the particle sizes of the product and/or the calcined powder at least before the reduction step, and
    a pulverization step for adjusting the particle sizes of said rare earth oxysulfide powder being not conducted after said reduction step.

13. The method for producing a scintillator array according to claim 11, wherein the step of arranging pluralities of said ceramic scintillators with a reflecting material to obtain said scintillator array comprises:
    fixing a ceramic scintillator plate to a support plate via a double-sided adhesive sheet,
    providing the scintillator plate with grooves to form a grooved scintillator substrate plate having pluralities of scintillator cells,
    filling the grooves with a liquid hardening resin for a reflecting material,
    curing the liquid hardening resin to form a resin-hardened scintillator cell body, and
    peeling the double-sided adhesive sheet from the resin-hardened scintillator cell body to produce said scintillator array.

14. The method for producing a radiation detector according to claim 12, wherein the step of combining said ceramic scintillators with detecting elements for detecting light emitted from said ceramic scintillators to obtain a radiation detector comprises:
   arranging pluralities of said ceramic scintillators with a reflecting material to obtain scintillator arrays; and
   aligning said scintillator arrays with corresponding silicon photodiode arrays to constitute a radiation detector.

15. The method for producing a radiation detector according to claim 14, wherein the step of aligning said scintillator arrays with corresponding silicon photodiode arrays to constitute a radiation detector comprises adhering a luminescence surface of each scintillator array with an optical resin to a light-receiving surface of each silicon photodiode array.

16. The method for producing a radiation detector according to claim 15, wherein the step of arranging pluralities of said ceramic scintillators with a reflecting material to obtain scintillator arrays comprises:
   fixing ceramic scintillator plates to support plates via double-sided adhesive sheets,
   providing the scintillator plates with grooves to form grooved scintillator substrate plates having pluralities of scintillator cells,
   filling the grooves with a liquid hardening resin for a reflecting material,
   curing the liquid hardening resin to form resin-hardened scintillator cell bodies, and
   peeling the double-sided adhesive sheets from the resin-hardened scintillator cell bodies to produce said scintillator arrays.

* * * * *